Oct. 28, 1958

C. W. PETERSEN 2,858,153

SUPPORTING ATTACHMENT

Filed Feb. 21, 1957

INVENTOR.
Clifford W. Petersen
BY
Arnold P. Eiisen
Attorney

# United States Patent Office 2,858,153
Patented Oct. 28, 1958

2,858,153
SUPPORTING ATTACHMENT

Clifford W. Petersen, Wauwatosa, Wis., assignor to McGraw-Edison Company, Milwaukee, Wis., a corporation of Delaware Application February 21, 1957, Serial No. 641,551

5 Claims. (Cl. 287—54)

The present invention relates to an attaching means for mounting or joining together fittings, or intersecting members laterally relative to a tubular support member, and wherein stress is applied to the tubular support member transversely relative to its longitudinal axis.

It is an object of the present invention to provide an attaching means for a tubular support member including a stress distributing member arranged to impart attaching load stresses to opposite sides of said support member at either end of a thru bolt positioned transversely thereof.

Among other objects of the present invention is the provision of an attaching means for a tubular support member comprising a tubular spacer or sleeve member which is positioned concentrically relative to a thru bolt member received by registering openings, the axis of which is transversely relative to the longitudinal axis of said tubular support member, and wherein the aperture adjacent a joining load member is of relatively smaller dimension than the outer diameter of the abutting tubular spacer member to provide a bearing surface for one end of the spacer member, and wherein the opposed aperture is of sufficient dimension to slidably receive the outer diameter of the tubular spacer member when positioned on said thru bolt.

The novel features of this invention are pointed out hereinafter in conjunction with the detailed description of embodiments of load supporting members including the improved attaching means, which are illustrated in the accompanying drawing, wherein.

In both embodiments like parts are designated by like reference numerals.

Figure 1:
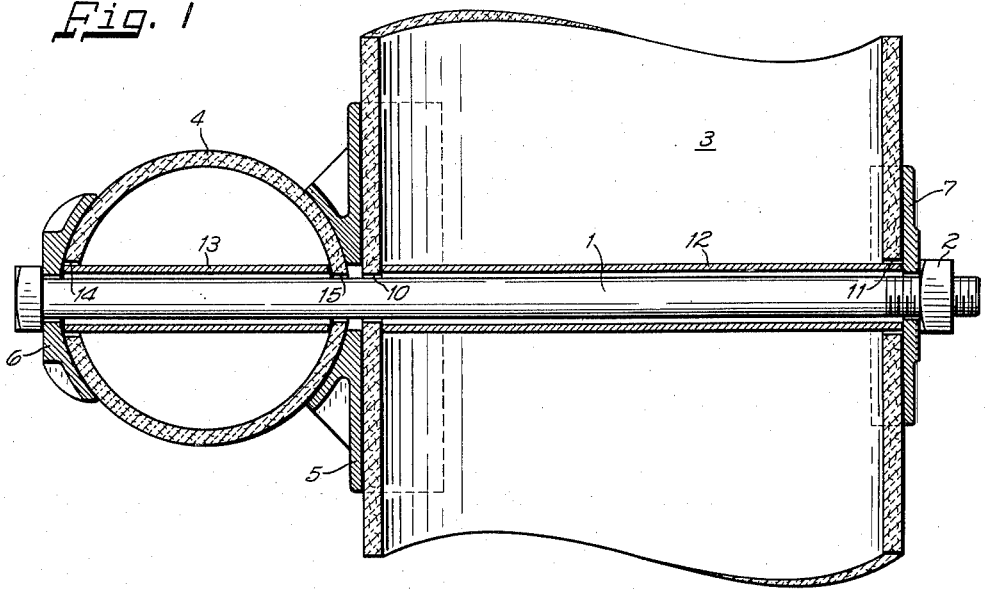
Fig. 1 is a fragmentary view in longitudinal section taken through a tubular support member, such as a vertical pole or standard, and illustrating a means of attaching a transversely relative tubular cross arm member.

Referring now to the drawing, and initially to the embodiment of Fig. 1, it will be apparent that the attaching means includes a thru bolt member 1 threaded at one end to receive an engaging nut 2 for attachment to a tubular support member 3. The present invention has particular application in the field of vertical support members, such as communication and power poles or street light standards of reinforced fiber glass construction, which have recently been introduced to the market.

In the particular embodiment shown, a tubular cross arm 4 is illustrated in position transversely relative to the support member 3, being separated by and supported relative to the member 3 by means of a gain 5 having curved inner surfaces substantially conforming to the outer diameter of the members 3 and 4. Curved washers 6 and 7 are preferably positioned on the thru bolt 1 adjacent the head portion of the bolt and the nut 2, respectively. The inner curvatures of the washers 6 and 7 substantially conform to the diameters of the members 3 and 4, respectively, to provide a relatively large bearing surface for clamping engagement.

It will be apparent, that without additional means, tightening of the nut on the bolt will tend to force the tubular wall surfaces of the members 3 and 4 towards a direction where the walls might tend to collapse. The present invention contemplates such condition and provides a novel means for preventing its occurrence by providing increased strength in the direction of application of bearing forces.

As illustrated, the support member 3 is provided with opposed apertures 10 and 11 for slidably receiving the thru bolt 1. It will also be apparent that the aperture 10 is of relatively smaller dimension than the aperture 11. Concentrically of the thru bolt, and slidable relative thereto is a tubular or sleeve spacer member 12. The sleeve member 12 is slidably received by the aperture 11, but is of relatively greater external diameter than the dimension of the aperture 10, and thereby prevented from passing through the said aperture. However, it is to be noted that the sleeve member 12 bears directly against the wall surface of the support member 3 to bear against the surface in cooperation with the oppositely bearing gain member 5.

It will also be apparent, in the present embodiment, which discloses a tubular crossarm 4, that a sleeve spacer member 13 is preferably provided in the same manner as the sleeve member 12. That is, the tubular crossarm 4 is provided with diametrically opposed apertures 14 and 15 being of sufficient dimension to slidably receive the thru bolt 1. However, the aperture 15 is of relatively lesser dimension than the aperture 14, and also less than the external diameter of the sleeve 13 to prevent passage of the sleeve therethrough. The aperture 14 is arranged to slidably receive the tubular or sleeve member 13.

When assembling the joined members 3 and 4 relative to one another, the curved washer 6 is first positioned on the thru bolt, and the tubular member 13 is next slipped over the thru bolt and positioned adjacent the curved washer 6. This assembly is then seated transversely of the bore of the crossarm 4 as shown. The gain member 5 is then slipped over the end of the thru bolt and positioned with its respective curved surface adjacent the crossarm 4. The assembly is then seated in the apertures 10 and 11 of the tubular support member 3, with the thru bolt extending therethrough. The tubular or sleeve member 12 is received by the aperture 11 and positioned as shown, with the washer 7 being next placed in position adjacent the outer surface of the support member 3. The nut 2 is then threaded on the end of the bolt and tightened to the desired torque.

The thru bolt 1, if used without the novel sleeve 12, will apply a lateral load to only one portion of the tubular wall. The portion would obviously be adjacent the thru bolt at the wall surface opposite the side where the load is applied. The reason for this is, that the bolt would be free to slide within both apertures and most of the force would be applied to the surface which is not abutting or bearing against the load fitting and therefore being free to collapse. However, it will be apparent that the load applied to the thru bolt and the embodiments disclosed herein in a direction towards a crossarm 4, that the tubular or sleeve member 12 will be forced against the marginal wall surface adjacent the aperture 10 when the nut 2 is tightened on the bolt. This tends to "pinch" the respective wall surfaces of the crossarm 4 and support member 3 between the gain member 5 and the respective sleeve members 12 and 13. Thus, the lateral loading forces on the thru bolt will bear against the diametrically opposed wall surfaces of the member 3 surrounding the apertures 10 and 11 and of the like opposed surfaces of the crossarm 4, and tend to distribute the forces therebetween.

It will be apparent that, though not specifically illustrated, that if so desired, the crossarm 4 may be positioned transversely relative to the tubular support member 3 being slidably received by registering diametrically opposed apertures drilled or otherwise formed in the support member. Here a thru bolt member may again be positioned transversely relative to both the crossarm and the support member. The opposed thru bolt apertures of both interfitting members may be of relative dimension, with one slidably receiving a sleeve or spacer member and the other preventing its passage. A first sleeve or spacer member is slidably inserted through registering openings in the support member and the crossarm and abuts the opposite smaller opening in the crossarm. A second sleeve or spacer member abuts the said opposite smaller opening at the outside surface of the crossarm to center the crossarm and prevent rotation from its preferred position.

Figure 2:
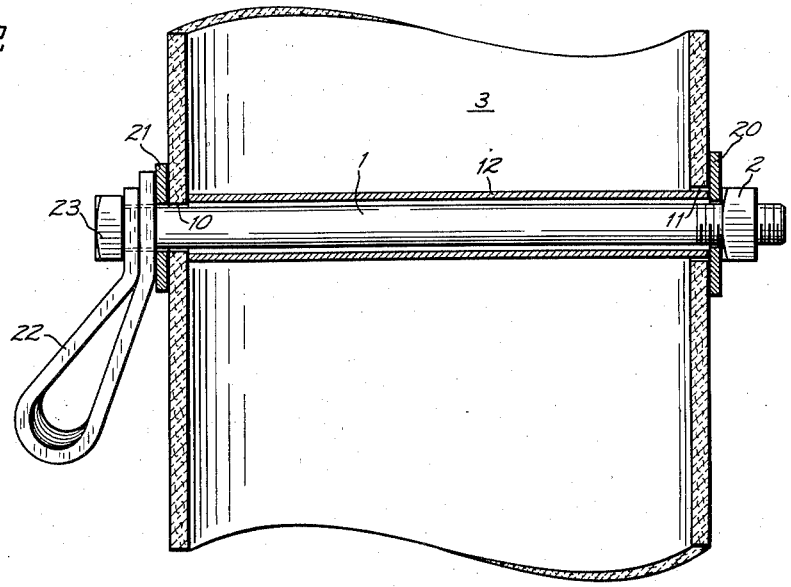
Fig. 2 is a fragmentary view taken in longitudinal section through a tubular support member indicating a further embodiment of the means for attaching a transverse load to a guy attachment or take-off fitting from the said tubular support member.

In connection with the embodiment of Fig. 2, test procedures have indicated that an angular guy load at 30 degrees relative to the tubular support member 3, without the tubular or sleeve member 12, sustains a load of about 2700 pounds before collapsing the wall surface adjacent to the nut 2, and elongating downward the wall surface adjacent to washer 21. Whereas, when a 30 degree guy load is applied to a similar structure with the tubular sleeve member 12, loading may exceed 3600 pounds.

In the embodiment of Fig. 2 there is shown an arrangement for mounting an attachment means for receiving a guy wire adapted to secure the vertical support member 3 in a direction opposed to a load, such as that imposed by the weight of a communication or electric power line. In the present embodiment, the thru bolt 1 is positioned transversely of the tubular support member 3 and slidable relative to the apertures 10 and 11 respectively. Here, if so desired, a conventional annular washer 20, or curved washer (not shown), may be used as a bearing surface between the member 3 and the nut 2. Another washer 21 may be positioned adjacent the opposite side of the member 3, and an angle guy attachment 22 is positioned intermediate the washer 21 and the bolt head 23 for reception of a guy wire cable (not shown). The tubular sleeve member 12 is mounted in the same manner as in the embodiment of Fig. 1 and is of sufficient external diameter that it is prevented from passage through the aperture 10, although it is readily slidably received by the aperture 11.

In the present embodiment having a downward guying moment, it will be apparent that the wall of the tubular support member is pinched between the washer 21 and the spacer or sleeve member 12. This not only equally distributes the axial loading imposed upon the thru bolt 1 by tightening the nut, but the pinching action decreases the likelihood of the vertical component, or downward component, of the load which might crush the wall beneath the bolt and elongate the hole. Thus, the pinching action serves to take up a portion of the bearing strain imposed upon the relatively thin tubular wall.

In the case of both embodiments, it has been found preferable to provide a sleeve member of a length slightly less (measured by about one-half the wall thickness of the tubular support member) than the total length of the distance comprising the internal diameter of the tubular support member plus one wall thickness. By so doing, it is possible to compress the tubular wall slightly until the washers bear directly against the tubular member. At that time, additional application of load is taken off of the wall and transmitted directly to the tubular sleeve or spacer member which, because of its inherent strength and construction, can accept the load to prevent further deflection of the tubular support member. By this means, the deformed tubular wall, being of a resilient nature (especially in fiber-glass construction) will also act as a "lockwasher" constantly applying an axial load to the washer and compressing the washer against the nut. This prevents the nut from rotating under vibrating loads.

I claim:

1. A supporting attachment assembly for a tubular support member having a wall surface defining diametrically opposed apertures arranged to slidably receive a transversely positioned thru bolt, load applying means externally of said wall surface and exerting an axially directed load on said bolt, and a spacer member removably positioned internally of said tubular support member and being slidably received by one of said apertures and arranged for concurrent movement in a direction opposed to said axially directed load on said bolt, the other of said oppositely disposed apertures being of insufficient dimension to permit passage of said spacer member, whereby one end of said spacer member will engage said support member at the wall surface margin defining said other aperture thereby providing a means of distributing loads transversely applied to said tubular support member to opposite sides thereof.

2. A supporting attachment assembly for a tubular support member having a wall surface defining diametrically opposed apertures arranged to slidably receive a transversely positioned threaded thru bolt, a nut threadingly engageable with said bolt externally of said wall surface and arranged to move said bolt in a direction opposite from an axially directed load on said bolt, and a spacer member removably positioned internally of said tubular support member and being slidably received by one of said apertures and arranged for concurrent movement in a direction opposed to said bolt tightening movement, the other of said oppositely disposed apertures being of insufficient dimension to permit passage of said spacer member, whereby one end of said spacer member will engage said support member at the wall surface margin defining said other aperture thereby providing a means of distributing loads transversely applied to said tubular support member to opposite sides thereof.

3. A supporting attachment assembly for a tubular support member having a wall surface defining diametrically opposed apertures arranged to slidably receive a transversely positioned thru bolt, load applying means externally of said wall surface and exerting an axially directed load on said bolt and against said wall surface, and a spacer member removably positioned internally of said tubular support member and being slidably received by one of said apertures and arranged for concurrent movement in a direction opposed to said axially directed load on said bolt, the other of said oppositely disposed apertures being of insufficient dimension to permit passage of said spacer member and in communication with said load applying means, whereby one end of said spacer member and said load applying means will concurrently engage respective sides of the wall surface margin defining the said other aperture thereby providing a means of distributing loads transversely applied to said tubular support member to opposite sides thereof.

4. A supporting attachment assembly for a tubular support member having a wall surface defining diametrically opposed apertures arranged to slidably receive a transversely positioned thru bolt, a crossarm, a gain member disposed between said crossarm and said tubular support member, said crossarm and said gain member being apertured to slidably receive said bolt, and a tubular spacer member positioned internally of said tubular support member and disposed intermediate of and slidable relative to said bolt and to one of said apertures and arranged for concurrent movement in a direction towards said gain member, the other of said oppositely disposed apertures being of insufficient dimension to permit passage of said spacer member and in communication with the aperture of said gain member, whereby one end of said spacer member and said gain member will concurrently engage respective sides of the wall surface margin defining the said other aperture.

5. A supporting attachment assembly for a tubular pole having a wall surface defining diametrically opposed apertures arranged to slidably receive a transversely positioned thru bolt, a guy wire attachment secured externally of said wall surface and being apertured to slidably receive said bolt and further exerting an axially directed load on said bolt, and a tubular spacer member removably positioned internally of said tubular support member and disposed intermediate of and slidable relative to said bolt and to one of said apertures and arranged for concurrent movement in a direction towards said guy wire attachment, the other of said oppositely disposed apertures being of insufficient dimension to permit passage of said spacer member and in communication with the aperture of said attachment, whereby one end of said spacer member and said attachment will concurrently engage respective sides of the wall surface margin defining the said other aperture.

References Cited in the file of this patent

UNITED STATES PATENTS

| | | |
|---|---|---|
| 1,236,231 | Thomas | Aug. 7, 1917 |
| 2,323,829 | McArthur | July 6, 1943 |

FOREIGN PATENTS

| | | |
|---|---|---|
| 418,791 | Germany | Sept. 14, 1925 |